United States Patent [19]

Nogi et al.

[11] Patent Number: 4,678,581
[45] Date of Patent: Jul. 7, 1987

[54] POLYMETHYL METHACRYLATE HOLLOW FIBER TYPE ULTRAFILTRATION MEMBRANE AND PROCESS FOR PREPARATION OF THE SAME

[75] Inventors: Tatsuo Nogi; Tomonori Iwami; Kazumi Tanaka, all of Otsu, Japan

[73] Assignee: Toray Industries, Inc., Tokyo, Japan

[21] Appl. No.: 773,524

[22] PCT Filed: Oct. 28, 1982

[86] PCT No.: PCT/JP82/00422

§ 371 Date: Jun. 30, 1983

§ 102(e) Date: Jun. 30, 1983

[87] PCT Pub. No.: WO83/01632

PCT Pub. Date: May 11, 1983

Related U.S. Application Data

[63] Continuation of Ser. No. 517,517, Jun. 30, 1983, abandoned.

[30] Foreign Application Priority Data

Oct. 30, 1981 [JP] Japan ................................ 56-173099
May 14, 1982 [JP] Japan .................................. 57-80268

[51] Int. Cl.$^4$ .............................................. B01D 13/00
[52] U.S. Cl. .......................... 210/500.23; 210/500.35; 210/500.42; 264/184
[58] Field of Search ................ 210/490, 500.2, 500.23, 210/500.35, 500.42; 264/41, 184

[56] References Cited

U.S. PATENT DOCUMENTS 3,615,024 10/1971 Michaels ............................ 210/41 X
3,892,665 7/1975 Steigelmann ......................... 210/490
4,439,322 3/1984 Sohoda et al. .................... 210/500.2

*Primary Examiner*—Frank Spear
*Attorney, Agent, or Firm*—Austin Miller

[57] ABSTRACT

The present invention relates to a hollow fiber type ultrafiltration membrane comprising a material of polymethyl methacrylate series in which no crosslinking is formed substantially and a process for its preparation. By employing adequate conditions, this material which is easy to handle makes it possible to achieve a steady manufacturing process and a constant quality of product. The obtained membrane is excellent in selective permeability and bio-compatibility, and expected to show its effect mainly in medical applications such as separation of plasma.

15 Claims, No Drawings

POLYMETHYL METHACRYLATE HOLLOW FIBER TYPE ULTRAFILTRATION MEMBRANE AND PROCESS FOR PREPARATION OF THE SAME

This application is a continuation of application Ser. No. 517,517, filed 6/30/83, now abandoned.

FIELD OF THE ART

Present invention relates to a polymethyl methacrylate (hereinafter referred to as PMMA) hollow fiber type ultrafiltration membrane having an excellent selectivity and bio-compatibility and a process for its preparation. This membrane is used, for example, for separation of corpuscles from plasma and is expected to show an effect in the therapy of immuno-diseases (rheumatism, SLE, nephritis).

BACKGROUND ART

Methods involving separating materials by employing membranes have recently been developing and have been drawing great attention in various fields of technology and industry, including waste water disposal, food industry and medical applications. These methods include microfiltration, ultrafiltration and dialysis, and are selectively employed to suit the particle sizes and materials floating, dispersed or dissolved in an aqueous medium. While different types of membranes are, of course, used for different purposes of separation, all the membranes are required to have a high rate of permeation to an aqueous medium, to be highly capable of removing the materials floating, dispersed or dissolved therein, and to have a high degree of mechanical strength and chemical resistance.

For such requests, hollow fiber separation membranes of, for example, cellulose or cellulose acetate are proposed. However, such membranes have faults as follows: the structure of the membrane tends to become excessively minute; since it is difficult to form fine pores of a suitable size for the hollow fiber type ultrafiltration membrane, the manufacturing process tends to become complicated; consequently, the strength of the hollow fiber is excessively reduced and its quality is not constant. In this connection, the ion-crosslinked hydrous PMMA membrane which is obtained from a mixture of methyl methacrylate copolymer containing sulfonic acid group and methyl methacrylate copolymer containing quarternary nitrogen group, is already proposed in U.S. Pat. No. 4,439,322.

The proposal makes it possible to obtain hollow fiber type ultrafiltration membranes of various grades which are excellent in performance and mechanical characteristics, but some problems are involved in the proposal because it takes the introduction of ion-crosslinking as its essential condition. Examples of the problems are as follows: since dissolving conditions of the spinning solution are not stable, the greatest care must be given to obtain homogeneous dissolution; meshes of the filter tend to be packed during spinning, namely, the pack-life is short; the greatest care is necessary for stable storage of the spinning solution; since ion balance has a large influence on the performance and mechanical characteristics, much care must be taken; the greatest consideration must be given to control the copolymer because ion distributions in the copolymer have an effect on the performance and others.

In order to solve the aforesaid problems, the present invention has found a product capable of being constantly prepared at low cost by developing a technique in which a PMMA polymer containing no ion pair is applied as the raw polymer.

Typical forms of selective semipermeable membranes include three types such as flat membrane, tubular membrane, and hollow fiber type membrane, which have an individual feature of application and device depending on each form. Among them, the hollow fiber type membrane has such merits that a large membrane area is obtainable, a small-sized device is available, and loss of the membrane is less and the costs are low, in the manufacture of devices and modules.

DISCLOSURE OF THE INVENTION

In order to achieve the aforementioned purposes, the present invention comprises:

(1) A hollow fiber type ultrafiltration membrane consisting of a PMMA polymer in which no ion-crosslinking is substantially formed, the permeability of albumin is not less than 30% and the permeation volume of water (water UFRS) is 0.1 to 30 l/hr.m².mmHg.

(2) A process for preparation of a PMMA hollow fiber type ultrafiltration membrane comprising discharging, followed by coagulating, a substantially non-crosslinked PMMA polymer of the raw material through spinneret used for hollow fiber, in which an organic solvent containing a controlling agent of membrane pore size is used as the solvent, and the relation of $$Ts-20 < To < Ts+40,$$

where $Ts$ (°C.) is phase separation temperature and $To$ (°C.) is spinneret temperature, is satisfied in spinning of a solution in which 5 to 30% by weight of the polymer is dissolved.

Through the adoption of the aforesaid technical constitution, the present invention can unprecedently provide a product of constant quality under an easy control by using a common PMMA polymer containing no crosslinking as the raw material, as well as an ultrafiltration membrane having an excellent selectivity only by controlling compounding proportions and additives.

MOST PREFERRED FORM FOR EMBODIMENT OF THE INVENTION

The present invention makes it possible to improve PMMA hollow fiber type ultrafiltration membrane so as to be compatible for blood to a high extent and become a biocompatible material for contacting with blood, plasma or serum in the blood purifying system such as plasma separation or artificial liver. Examples of the use are plasma separation (separation of tangible component from plasma in blood), therapy of immuno-diseases (rheumatism, SLE, nephritis) by separation between high molecular weight protein such as immune-complex and low molecular weight protein such as albumin, and refining (elimination of cell multiplication retarding component and denaturing component) of sera used for cultivation.

A membrane for plasma separation is required to have a high rate of plasma filtration without causing any homolysis or coagulation of blood, and must at the same time be highly permeable to albumin, globulin and other plasma proteins However, it should be totally impermeable to red and white blood cells and platelets. While the rate of plasma filtration depends on the hematocrit value of blood, on the concentration of proteins, on the flow rate of blood, on the filtration pressure and the like, clinical application of the membrane requires a plasma filtration rate of about 30 to 60 ml/min when the blood is flowing at a rate of 100 ml/min. In this connection, the membrane is required to have an albumin permeability of at least 90%, preferably substantially 100%, and to have a water permeation rate (water UFR, UFRS) of about 2 to 30 liters/hr.m$^2$mmHg. In other words, the membrane is required to have a high degree of porosity, and to have a pore diameter of about 0.1 to 0.8 micron.

Although the particle sizes of the portions to be separated depends on the nature of the disease involved, or on the purpose of the culture, membranes used in treatment of immuno-diseases, or in refining of culture sera, are required to have albumin permeabilities of about 30 to 100%, preferably 70 to 100%, and to have water permeabilities of about 0.1 to 20 liters/hr.m$^2$.mmHg, preferably 1 to 10 l/hr.m$^2$.mmHg. In other words, the membrane is required to have a high degree of porosity, and to have a pore diameter of about 0.01 to 0.2 micron The present invention is capable of providing a membrane to fully satisfy the aforesaid requirements.

The above-mentioned water permeation rate (water UFRS) and albumin permeability are determined in a customary manner, by using distilled water, and a solution of bovine albumin (Fr. V) (e.g., product of Seikagaku Kogyo Co., Ltd., or Sigma) in distilled water having a concentration of 0.2 g/dl, respectively. The albumin permeability of the membrane is determined by using a module composing of a bundle of at least 10 hollow fibers and having an effective length of at least 5 cm. The solution is passed through the hollow fibers at an entering linear velocity of at least 5 cm/sec., at a temperature of 25° C. and a pressure of 50 mmHg. Determination of permeability is based on the filtrate obtained during a period of 30 minutes after it has been stabilized with a lapse of 30 to 60 minutes, and is calculated as follows:

$$\text{Permeability (\%)} = \frac{\text{Concentration of albumin in the filtrate}}{\text{Concentration of albumin in the original solution}} \times 100$$

The substantially forming of ion crosslinking means gelation caused by formation of an ion bond by both ionic groups as in a mixture of methyl methacrylate copolymer containing an anionic group such as sulfonic acid group and methyl methacrylate containing a cationic group such as quaternary nitrogen group. The phenomenon of gelation can be confirmed by the presence or absence of a break point in a graph of logarithmic viscosity vs. reciprocal absolute temperature. In more detail, it is explained as follows: no ion crosslinking is formed in a polymer solution which contains atactic PMMA obtained by common radical polymerization, syndiotactic PMMA or both PMMA rich in isotacticity and PMMA rich in syndiotacticity, and which is a mixture of PMMA capable of forming a stereocomplex and contains no ion pair. The present invention may, of course, be partially polymerized with other monomers, if it contains no ion pair. When, even if a composition contains an ion pair, the amount of the ion pair is small or the ion pair is shifted to one side and so ion crosslinking is not formed substantially, the composition is naturally included in the present invention.

An average molecular weight of these polymers as the raw material may be varied in view of spinning conditions and forms or mechanical properties which are required depending on the usage of hollow fiber type membrane. In general, the average molecular weight is not less than 100,000, preferably 200,000 to 2,000,000, and most preferably 500,000 to 1,000,000. When the average molecular weight is too low, then bad spinning results, and no constant quality is retained. When too high, the roundness of hollow fiber is impaired and there occur frequent breaks during spinning. Average molecular weight M should be calculated from viscosity of chloroform solution of PMMA by the following formula.

$$n = 4.8 \times 10^{-5} M^{0.8}$$

The solvent used for preparation of the spinning solution is required to be one dissolving the aforesaid polymer as the raw material and eventually capable of water substitution.

Examples of the solvent are dimethyl sulfoxide, dimethyl formamide, dimethyl acetamide, N-methyl pyrrolidone, acetonitril, acetone, methyl ethyl ketone, methyl cellosolve, and methyl carbitol, and also mixtures thereof. Among them, especially dimethyl sulfoxide and dimethyl formamide which are used in combination with glycerin or formamide as described later, enlarge fine pore size with ease, and so these solvents are a preferable solvent for use in the precision filter membrane or ultrafiltration membrane of the present invention.

In particular, dimethyl sulfoxide makes it possible to obtain a membrane having a wide scope of permeability, including a membrane of a larger pore size than that of dimethyl formamide, and may be said to be most preferable for the membrane used in medical application which requires a very low toxicity.

When preparing the solution, it is preferable to add water, formamide, an alcohol such as butanol, propanol, ethylene glycol or glycerin, or non-solvents such as urea or calcium chloride, or a surface active agent such as polyoxyethylene-etherlauryl alcohol (Brij-35) or isooctylphenoxypolyethoxy ethanol (Triton X-100), or polyethylene glycol in order to manufacture a membrane having a pore diameter which is suitable for the purpose for which it is used. Water, glycerin and formamide are particularly preferred for incorporation into a solution from which an ultrafiltration or plasma separation membrane having a large pore diameter is to be manufactured. Glycerin is preferable to formamide for use in the manufacture of a membrane for medical applications, since the former is much lower in toxicity than the latter.

In order to obtain a crosslinked PMMA membrane having an albumin permeability of at least 30% and a water ultrafiltration rate (UFR) of 0.1 to 30 liters hr.m$^2$.mmHg according to this invention, it is preferable to use as the solvent dimethylsulfoxide (DMSO) or dimethylformamide (DMF) containing about 5 to 40% by weight of glycerin or formamide. An increase in the quantity of grycerin or formamide generally tend to result in a membrane having a larger pore diameter and a higher degree of permeability.

Concentration of the spinning solution varies according to kinds of solvents used, spinning conditions and fine pore sizes of objective separation membranes, and usually ranges from 5 to 40% by weight, preferably from 7 to 30% by weight. In preparation of a spinning solution, a stable solution can be obtained by adding to a raw material a pore-size control agent over a long period of time with stirring after the raw material has been dissolved in a solvent. In a mixture system of the solvent and pore-size control agent of the present invention, a composition which cannot directly dissolve the raw material is often employed. On the other hand, in the case of using PMMA capable of forming ion cross-linking, the dissolving condition is very unstable due to interruption among ions despite the fact that the raw material can be directly dissolved in the aforesaid mixture system.

The spinning solution thus obtained is fabricated into a hollow fiber type ultrafiltration membrane by means of the dry and wet spinning. In the present invention, the spinneret incorporating a double tube inside thereof is preferably used in view of the purpose. Various methods of spinning hollow fiber using such a spinneret have been proposed, but the hollow fiber type ultrafiltration membrane used in the separation device of the mixture which is an object of the present invention is preferred that has a uniform cross section and approximately true roundness.

In the present invention, it is preferred that spinning is conducted while quantitatively pouring a liquid from the inside tube of the aforesaid double tube into the inside of a hollow fiber, the said liquid especially being the solvent used in the spinning solution, a mixture of said solvent and water, or a mixture of the same solvent and polyhydric alcohol. Since the poured liquid takes part in formation of the inside structure of hollow fiber on contact with the spinning solution, it is necessary to check the property of spinning solution and a proper selection must be made according to purposes. For example, in the case of using blood purification, care must be taken not to cause too rapid coagulation in an attempt to obtain a uniform inside structure. In a mixture system of a solvent and water, for example, a range of not more than 40% of water is preferred. Polyhydric alcohol which is usually used includes glycerin, ethylene glycol, diethylene glycol, propandiol, etc., without limitation thereto.

In the present invention, it is possible to conduct spinning by introducing gas into the hollow portion of a hollow fiber. In this case, it is desirable that a spinning solution of higher viscosity than in the case of introducing a liquid into the hollow portion is used in order to achieve a steady spinning. In particular, the use of stereocomplex type spinning solution results in steady spinning.

There is also another important factor such as setting the spinneret temperature. When rapid gelation is caused to occur by setting the spinneret temperature at a lower temperature, phase separation between the solvent and polymer is promoted to form a hollow fiber type membrane with a relatively large fine pore size. In contrast, when a slow fiber formation is conducted by setting the spinneret temperature at a higher temperature, conditions must be selected according to purposes because formation of a relatively minute pore membrane. By maintaining the range represented by the following formula, where spinneret temperature is To (°C.) and phase separation temperature of spinning solution is Ts (°C.), the performance of hollow fiber type membrane and spinning conditions become constant.

$$Ts-20<To<Ts+40$$

Where phase separation temperature, Ts (°C.) is a temperature at which a turbidity is observed by lowering the temperature of spinning solution at a rate of 1° C./10 min.

Though varying with purposes, the temperature of spinning solution is kept at about 50° C. at least, preferably in the range of about 50° to 140° C., and a hollow fiber type membrane useful for the ultrafiltration can be produced thereby. A sol in the form of hollow fiber spun through the spinneret in the aforesaid manner undergoes gelation and an adequate phase separation while passing through air or inert gas, and thereafter is led to a coagulating bath.

It is an important process for the present invention that a hollow fiber in a state of sol as extruded through the spinneret is subjected to gelation and phase separation, and thereafter to the action of coagulating bath. With this process, atmospheric conditions are different for different thicknesses of fiber streaks spun, spinning speeds, and spinning temperatures, and therefore cannot be generally specified. However, in the usually preferred condition, distance from the spinneret to the inlet to coagulating bath is not shorter than 0.5 cm and not longer than 100 cm, preferably not shorter than 5 cm and not longer than 50 cm. Ranges other than that specified above make the steady spinning difficult. Usually, temperature of the atmosphere may be ambient temperature or room temperature, but in some cases, forced cooling may be employed in order to promote gelation and phase separation. It is also possible to control subtly membrane performances through an adequate adjustment of humidity.

As the coagulating bath of the present invention, such substances may be used that are non-solvent of the polymer of the present invention and miscible with the solvent of the spinning solution, and said substances may be used in the coagulating bath independently or as a mixture with the solvent of the spinning solution. In order to obtain eventually a hydrous hollow fiber, it is practical that one miscible with water is selected for the solvent of spinning solution, and water or a mixture of water and a solvent used in spinning solution is employed. The water permeability of membrane depends upon temperature of the coagulating bath, and in general, there is a tendency that the higher the temperature, the higher the water permeability. The temperature is usually set in the range of 0° to 98° C.

The hollow fiber type membrane obtained in the present invention preferably features that a cross section through the hollow portion is substantially of round shape, the thickness of the membrane constantly ranges from 5 to 500µ, and the inside diameter, though with varying purposes, is in the range of 70 to 1000µ.

When kept in a wet state, the membrane of the present invention does not undergo significant changes in permeability and mechanical properties over a long period of time. When an adequate wetting agent such as hydrous glycerin is applied to the membrane, it is also possible for the membrane to be stored in a dry state. Wetting agents other than the aforesaid agent include ethylene glycol, polyethylene glycol, and surface active agents of various types. Through the heating treatment following preparation of a membrane, it is also possible to change the permeability and mechanical properties (constancy of dimensions) of the membrane. The heating treatment is carried out under tension applied or no tension, and its temperature is usually in the range of from 50° to 110° C., preferably from 70° to 90° C. The membrane thus obtained is by no means inferior in mechanical characteristics to the one in which an ion-crosslinked PMMA type material is used.

The ultrafiltration membrane of the present invention which is most suitable for use in medical applications as stated previously, is also suitable for the following applications: separation of fine particles in a solution in which the shape of particles to be separated varies at random and suspension is entirely formed; a separation of emulsion or between oil and water; condensation of milk particles; condensation of latex agents; and purification of beer, wine, sake, and juice. The membrane can also be used in clarifying filtration of a suspension of sterile particles, sterile filtration and preparation of an ultra pure water.

EXAMPLE 1

Common radical polymerization PMMA (weight average molecular weight: 1,500,000) of 125 parts and 25 parts of isotactic PMMA (polymerized by Grignard catalyst; weight average molecular weight: 660,000) were dissolved with stirring in 1000 parts of dimethyl sulfoxide at 120° C. for 12 hours. After the temperature is raised to 125° C., a mixture of 200 parts of dimethyl sulfoxide and 150 parts of glycerin dissolved therein was dropped over 2 hours while continuing stirring. After the stirring was continued for another 4 hours, a homogeneous solution was obtained. On the other hand, in order to dissolve directly the afore-mentioned PMMA mixture in a mixture solvent of 150 parts of glycerin and 1200 parts of dimethyl sulfoxide, 18 hours was spent while stirring at 125° C., but no homogeneous solution was obtained. The phase separation temperature of the above-mentioned homogeneous solution was 115° C. While being filtered through a hopper at 120° C. by a porous filter of $5\mu$ in pore size kept at 120° C., the said spinning solution was discharged through a spinneret for hollow fiber into air at a rate of 5.3 g/min. At the same time, a mixture of dimethyl sulfoxide/water (90/10) was poured into the inside of the hollow fiber at a rate of 1.65 ml/min. The temperature of the spinneret at this time was 113° C., and the dry length of the discharged fiber streak was kept at 10 cm. Subsequently, the resulting fiber was immersed by 45 cm in a coagulating bath at 90° C. comprising a 5 % dimethyl sulfoxide aqueous solution, then washed with water, and reeled up at a rate of 20.5 m/min. A bundle of hollow fibers was prepared by cutting the obtained fiber. The hollow fiber thus obtained had an inside diameter of $349\mu$, a membrane thickness of $68\mu$ and an out of roundness (shorter diameter/longer diameter) of 96%. In additon, the fiber had a water UFRS of 4100 ml/hr.m$^2$.mmHg and a albumin permeability of 100%, along with a tensile strength of 25 g and an elongation of 10%.

In the present example, steady spinning could be continued until the meshes of the filter became packed after 250 hours. In contrast, when a spinning solution forming ion-crosslinking which was prepared in comparative Example 2 as described later was spun in the same manner, the meshes of the filter became packed in 50 hours, making it impossible to continue the spinning on.

EXAMPLE 2

Common radical polymerization PMMA (weight average molocular weight: 1,500,000) of 180 parts and 36 parts of isotactic PMMA (polymerized by Grignard catalyst; weight average molecular weight: 660,000) were dissolved in a mixture solvent of 1346 parts of dimethyl sulfoxide and 238 parts of formamide in the same manner as Example 1, spending 17 hours at 120° C., and thus a spinning solution was prepared. The phase separation temperature was 120° C. This spinning solution was discharged into air through a hollow fiber spinneret with an outside diameter of 1.4 $\phi$ and inside diameter of 1.0 $\phi$ at a rate of 5.3 g/min, and at the same time, a mixture of dimethyl sulfoxide/water (95/5) was poured into the inside of the hollow small tube of said spinneret at a rate of 1.65 ml/min. At this time, the temperature of the spinning spinneret was 115° C. and the spinning solution was kept at a temperature of 115° C. After traveling 3 cm in air, the discharged fiber streak was introduced into a soldifying liquid comprising water at 90° C., then washed with water and reeled up by a bobbin at a rate of 19.4 m/min. The hollow fiber thus obtained had the following features: the inside diameter was $350\mu$; the membrane thicknenss was $64\mu$; the cross section of the hollow fiber was of round shape; the water UFRS was 3100 ml/hr.m$^2$.mmHg; and the UFRS of albumin solution was 1800 ml/hr.m$^2$.mmHg and the permeability was 11%.

EXAMPLE 3

Common radical polymerization PMMA (weight average molecular weight; 1,500,000) of 200 parts and 40 parts of isotactic PMMA (polymerized by Grignard catalyst; weight average molecular weight: 660,000) were dissolved with stirring in a mixture solvent of 1006 parts of dimethyl sulfoxide and 87 parts of glycerin in the same manner as Example 1, spending 15 hours at 120° C., and thereafter were defoamed while being allowed to stand still, and a spinning solution was obtained. The phase separation temperature was 105° C. While being measured by a gear pump, this spinning solution was extruded into air through a hollow fiber spinneret at 100° C. at a rate of 1.64 g/min. Distance from the surface of the spinneret to the surface of a coagulating liquid was 1 cm, and water at 70° C. was used as the coagulating liquid. Air was self suctioned into the inside of the hollow fiber. After being washed with water, the resulting hollow fiber was subjected to a heat treatment for 19% releasing using water at 80° C., reeled up by a speed of 16.4 m/min, and cut to yield a hollow fiber bundle. The hollow fiber thus obtained had the following features: the inside diameter was $240\mu$; the membrane thickness was $100\mu$; the water UFRS was 750 ml/hr.m$^2$.mmHg; the UFRS with albumin solution was 120 ml/hr.m$^2$.mmHg; and the permeability was 48%

EXAMPLE 4

Common radical polymerization PMMA (weight average molecular weight: 1,050,000) of 180 parts and 90 parts of isotactic PMMA (polymerized by Grignard catalyst; weight average molecular weight: 720,000) were dissolved, with stirring at 120° C. for 12 hours, in a mixture solvent of 199 parts of glycerin and 1331 parts of dimethyl sulfoxide in the same manner as Example 1. The phase separation temperature was 118° C.

While being kept at 120° C., the spinning solution thus obtained was discharged into air through a hollow fiber spinneret at a rate of 4.2 g/min., and at the same time, cooling air was blown on the fiber streak beneath the spinneret. Nitrogen gas was pressure introduced into the inside of the hollow fiber. At this time, the temperature of the spinneret was 115° C. After travelling 25 cm in air, the hollow fiber was led into water at 80° C. for coagulation. After being washed with water, the resulting hollow fiber was immersed in a 70% aqueous solution of glycerin to prevent from drying, and then reeled up with a bobbin at a speed of 20 m/min. The hollow fiber thus obtained had following features: the inside diameter was 300μ; the membrane thickness was 90μ; the water UFRS was 3200 ml/hr.m$^2$.mmHg; and the permeability of albumin was 92%.

EXAMPLE 5

Common radical polymerization PMMA (weight average molecular weight: 1,050,000) of 150 parts and 30 parts of isotactic PMMA (polymerized by Grignard catalyst; weight average molecular weight: 720,000) was dissolved, with stirring at 120° C. for 15 hours, in a mixture solvent of 194 parts of glycerin and 1426 parts of dimethyl formamide in the same manner as Example 1. The phase separation temperature was 110° C. While dimethyl formamide containing 5% of water was poured into the follow portion, the resulting spinning solution was discharged into air through a hollow fiber spinneret which was set at 105° C., cooled and hardened in air by 15 cm, coagulated in water at 80° C., further washed with water, heat treated and reeled up to yield a hollow fiber bundle. The hollow fiber thus obtained had following features: the inside diameter was 340μ; the membrane thickness was 75μ; the water UFRS was 2200 ml/hr.m$^2$.mmHg; and the UFRS with albumin solution was 820 ml/hr.m$^2$.mmHg and permeability was 72%.

EXAMPLE 6

Common radical polymerization PMMA (weight average molecular weight: 1,050,000) of 129 parts and 15 parts of isotactic PMMA (polymerized by Grignard catalyst; weight average molecular weight: 660,000) was dissolved, with stirring at 120° C. for 15 hours, in a mixture solvent of 73 parts of water and 1383 parts of dimethyl sulfoxide in the same manner as Example 1. The phase separation temperature was 90° C. While being kept at 84° C., the resulting spinning solution was discharged into air through a spinneret at a rate of 3.0 g/min. Distance from the surface of the spinneret to the surface of a coagulating bath was 5.6 mm, and water at 25° C. was used as the coagulating bath. Air was self suctioned into the inside of the hollow fiber. After being washed with water, the hollow fiber was subjected to a release heat treatment of 7.1% with water at 74° C., reeled up by a drum at a speed of 20.6 m/min and cut to yield a hollow fiber bundle. The hollow fiber thus obtained had the following features: the inside diameter was 201μ; the membrane thickness was 120μ; the water UFRS was 2500 ml/hr.m2.mmHg; the permeability of albumin was 95%.

EXAMPLE 7

Common radical polymerization PMMA (weight average molecular weight: 1,360,000) of 150 parts was dissolved, with stirring at 120° C. for 18 hours, in a mixture solvent of 126 parts of glycerin and 1188 parts of dimethyl sulfoxide in the same manner as Example 1, and thereafter defoamed while being allowed to stand still to yield a spinning solution. The phase separation temperature of this spinning solution was 110° C. From a hopper at 120° C. and using a gear pump, the spinning solution was discharged into air through a hollow fiber spinneret at a rate of 5.6 g/min. At the same time, a mixture of dimethyl sulfoxide/water (85/15) was poured into the inside of the hollow fiber at a rate of 1.65 ml/min. At this time, the temperature of the spinneret was 110° C., and the dry length was kept at 15 cm. Subsequently, the resulting hollow fiber was immersed by 60 cm in a coagulating liquid comprising a 5% dimethyl sulfoxide aqueous solution at 90° C., then washed with water and reeled up at a speed of 20.5 m/min. The product was cut to yield a hollow fiber bundle. The hollow fiber thus obtained had the following features: the inside diameter was 352μ; the membrane thickness was 79μ; the out-of-roundness (shorter diameter/longer diameter) was 90%; the water UFRS was 4400 ml/hr.m$^2$.mmHg; the permeability of albumin was 100%; and the tensile strength was 17 g and the elongation was 7%.

EXAMPLE 8

By using the same spinning solution as in Example 7, spinning was conducted on the same conditions, with the exception of setting the temperature of spinneret at 130° C. The spinning solution thus obtained had the following features: the inside diameter was 351μ; the membrane thickness was 78μ; the out-of-roundness (shorter diameter/longer diameter) was 89%; the water UFRS was 3500 ml/hr.m$^2$.mmHg; the permeability of albumin was 95%; and the tensile strength was 20 g and the elongation was 10%.

COMPARATIVE EXAMPLE 1

As the result that spinning was conducted by using the same spinning solution as in Example 7 and on the same conditions, with the exception of setting the temperature of spinneret at 45° C., gelation already occurred inside the spinneret, and the discharged fiber streak was no longer transparent and became white turbid, making a steady spinning difficult.

EXAMPLE 9

In the same manner as Example 1, 165 parts of common radical polymerization PMMA (weight average molecular weight: 1,350,000) was dissolved, with stirring at 120° C. for 18 hours, in a mixture solvent of 200.3 parts of formamide and 1134.7 parts of dimethyl sulfoxide, then defoamed while being allowed to stand still, and thus a spinning solution was prepared. The phase separation temperature of this spinning solution was about 115° C. From a hopper at 120° C. and by using a gear pump, the spinning solution was discharged into air through a hollow fiber spinneret at a rate of 5.5 g/min. At the same time, a mixture of dimethyl sulfoxide/water (90/10) was poured into the inside of the hollow fiber at a rate of 1.7 ml/min. At this time, the temperature of the spinneret was 112° C., and the dry length was kept at 10 cm. The resulting hollow fiber was immersed by 60 cm in a coagulating bath at 90° C. comprising a 5% dimethyl sulfoxide aqueous solution, thereafter washed with water and reeled up at a speed of 20.5 m/min and cut to yield a hollow fiber bundle. The hollow fiber thus obtained had the following features: the inside diameter was 351μ; the membrane thickness was 69μ; the out-of-roundness was 93 %; the water UFRS was 2900 ml/hr.m$^2$.mmHg; and the permeability of albumin was 85%.

COMPARATIVE EXAMPLE 2

PMMA copolymer I (weight average molecular weight: 180,000) containing 2.7 mol % of p-styrene sodium sulfonate as the copolymer component and PMMA copolymer II (weight average molecular weight: 580,000) containing 2.5 mol % of 2-methacryloyl oxyethyl trimethyl ammonium chloride were obtained by radical polymerization. Each 135 parts of polymers I and II were dissolved in a mixture solvent of 1270 parts of dimethyl sulfoxide and 260 parts of glycerin, spending 8 hours at 120° C., and a spinning solution was thus obtained. The viscosity of this spinning solution was 190 poise (120° C.) which was determined by the falling ball method. While being filtered by a porous filter of 5 in pore size which was kept at 120° C. after leaving a hopper at 120° C., the spinning solution was discharged into air through a hollow fiber spinneret with a outside diameter of 1.4 $\phi$ and inside diameter of 1.0 $\phi$ at a rate of 5.3 g/min. At the same time, a mixture of dimethyl sulfoxide/water (95/5) was poured into the inside of the hollow small size tube of said spinneret at a rate of 1.65 ml/min. At this time, the temperature of the spinneret was 106° C., and the dry length was kept at 12.5 cm. Subsequently, the resulting hollow fiber was immersed by 60 cm in a coagulating liquid at 90° C. comprising a 5% dimethyl sulfoxide aqueous solution, thereafter washed with water and reeled up at a speed of 20.5 m/min. At this time, the meshes of the filter became packed in 50 hours, and it was difficult to continue the spinning.

In contrast, when the spinning solution prepared in Example 1 was spun in the same manner, the spinning could be continued for more than 200 hours.

EXAMPLE 10

Common radical polymerization PMMA (weight average molecular weight: 490,000) of 175 parts and 35 parts of isotactic PMMA (polymerized by Grignard catalyst; weight average molecular weight: 660,000) was dissolved in 800 parts of dimethyl sulfoxide with stirring at 120° C. for 12 hours. After the temperature was raised to 125° C., a mixture of 206.4 parts of glycerin and 283.6 parts of dimethyl sulfoxide dissolved therein was dropped through 2 hours while continuing stirring. After stirring was continued for another 4 hours, the product was defoamed while being allowed to stand still and a spinning solution was thus obtained. The phase separation temperature of this spinning solution was 118° C., and the viscosity measured by the falling ball method was 84 poise (120° C.). While being filtered by a porous filter of 5μ in pore size kept at 125° C. after leaving a hopper at 130° C., said spinning solution was discharged into air through a hollow fiber spinneret at a rate of 7.3 g/min. At the same time, a mixture of dimethyl sulfoxide/water (90/10) was poured into the inside of the hollow fiber at a rate of 1.7 ml/min. At this time, the temperature of the spinneret was 120° C., and the dry length was kept at 10 cm. The resulting hollow fiber was immersed by 45 cm in a coagulating solution comprising a 5% dimethyl sulfoxide aqueous solution at 90° C., then washed with water and reeled up at a speed of 20.5 m/min. The product was cut to yield a hollow fiber bundle.

The hollow fiber thus obtained had the following features: the inside diameter was 390μ; the membrane thickness was 96μ; the out-of-roundness (shorter diameter/longer diameter) was 93%; the water UFRS was 8400 ml/hr.m². mmHg; the UFRS with albumin aqueous solution was 5460 ml/hr.m².mmHg; the permeability of albumin was 100%; the UFRS of γ-globulin was 1020 ml/hr.m².mmHg; the permeability of γ-globulin was 95%, and the tensile strength of this hollow fiber was 55 g and the elongation was 19%.

We claim:

1. A hollow fiber structure ultrafiltration membrane of substantially uniform cross section comprising a material of the polymethyl methacrylate series, said material being a mixture of a polymer rich in isotacticity and a polymer rich in sindiotacticity, said polymer having a molecular weight of 100,000 to 2,000,000 and containing substantially no ion pairs so that substantially no crosslinking is formed, and said membrane having a permeability of albumin of not less than 90% and a water UFBS of 2 to 30 l/hr·m².mmHg.

2. A hollow fiber type ultrafiltration membrane claimed in claim 1, wherein the material is a copolymerized polymethyl methacrylate with a vinyl monomer other than methyl methacrylate.

3. A hollow fiber type ultrafiltration membrane claimed in claim 1, wherein the weight average molecular weight of the polymethyl methacrylate is not less than about 100,000.

4. A hollow fiber type ultrafiltration membrane claimed in claim 3, having a weight average molecular weight of 200,000 to 2,0000,000.

5. A hollow fiber type ultrafiltration membrane claimed in claim 4, having a weight average molecular weight of about 500,000 to 1,000,000.

6. The membrane defined in claim 1, wherein the material of the polymethyl methacrylate series is produced by common radical polymerization.

7. A process for preparation of a hollow fiber structure ultrafiltration membrane of substantially uniform cross section comprising discharging and coagulating a spinning solution through a hollow fiber spinneret wherein a material of the polymethyl methacrylate series is used, said material being a mixture of a polymer rich in isotacticity and a polymer rich in sindiotacticity, said polymer having a molecular weight of 100,000 to 2,000,000 and containing substantially no ion pair so that substantially no crosslinking is formed, and said membrane having a permeability of albumin of not less than 90% and a water UFRS of 2 to 30 liters/hr.m².mmHg, an organic solvent containing a membrane pore size controlling agent is employed as the solvent, a solution having a polymer concentration of 5 to 30% by weight dissolved therein is spun, and the relation of $T_s(°C.) - 20 < T_o < T_s + 40$, where $T_o$ (°C.) is the spinneret temperature, $T_s$ (°C.) is the phase separation temperature, is satisfied on the condition that the phase separation temperature $T_s$ is the temperature at which turbidity is observed when the temperature of the spinning solution is lowered at a rate of 1°C./10 min.

8. A process for preparation of a hollow fiber type ultrafiltration membrane claimed in claim 7, wherein the organic solvent is selected from the group of dimethyl sulfoxide, dimethyl formamide, dimethyl acetamide, N-methyl pyrrolidone, acetonitril, acetone, methyl ethyl ketone, methyl cellosolve and methyl carbitol.

9. A process for preparation of a hollow fiber type ultrafiltration membrane claimed in claim 7, wherein the membrane pore size controlling agent is selectd from the group of water, formamide, alcohols, urea, calcium chloride, polyoxyethylene ester lauryl alcohol, and iso-octyl phenoxy polyethoxyethanol.

10. A process for preparation of a hollow fiber type ultrafiltration membrane claimed in claim 7, wherein the organic solvent is selected from dimethyl sulfoxide and dimethyl formamide, the membrane pore size controlling agent is selected from glycerin and formamide, and the solvent contains 5 to 40% of membrane pore size controlling agent.

11. A process for preparation of a hollow fiber type ultrafiltration membrane claimed in claim 7, wherein the hollow fiber spinneret is a spinneret composed of a ring-shaped orifice containing a hollow small size tube inside the spinneret hole, and the substance poured through the hollow tube into the inside of a hollow fiber is selected from among solvent, a mixture of solvent and water, a mixture of solvent and polyhydric alcohol, air and inert gas.

12. A process for preparation of a hollow fiber type ultrafiltration membrane claimed in claim 7, wherein the distance through which a spun substance passes in air or inert gas before being led from a spinneret to a coagulating bath is about from 0.5 to 100 cm.

13. A process for preparation of a hollow fiber type ultrafiltration membrane claimed in claim 7, wherein the distance through which a spun substance passes in air or inert gas before being led from a spinneret to a coagulating bath is about from 5 to 50 cm.

14. A process for preparation of a hollow fiber type ultrafiltration membrane claimed in claim 7, wherein the coagulating solution is water or a mixture of solvent and water, and the temperature of the coagulating bath is about from 0° to 98° C.

15. The process defined in claim 7 wherein the material of the polymethyl methacrylate series is produced by common radical polymerization.

* * * * *